Dec. 24, 1968  A. W. FRANCIS, JR  3,418,252
EMULSION TREATMENT APPARATUS

Filed Nov. 25, 1966  2 Sheets-Sheet 1

INVENTOR.
ALEX W. FRANCIS, JR.
BY
ATTORNEY

Dec. 24, 1968  A. W. FRANCIS, JR  3,418,252
EMULSION TREATMENT APPARATUS
Filed Nov. 25, 1966  2 Sheets-Sheet 2
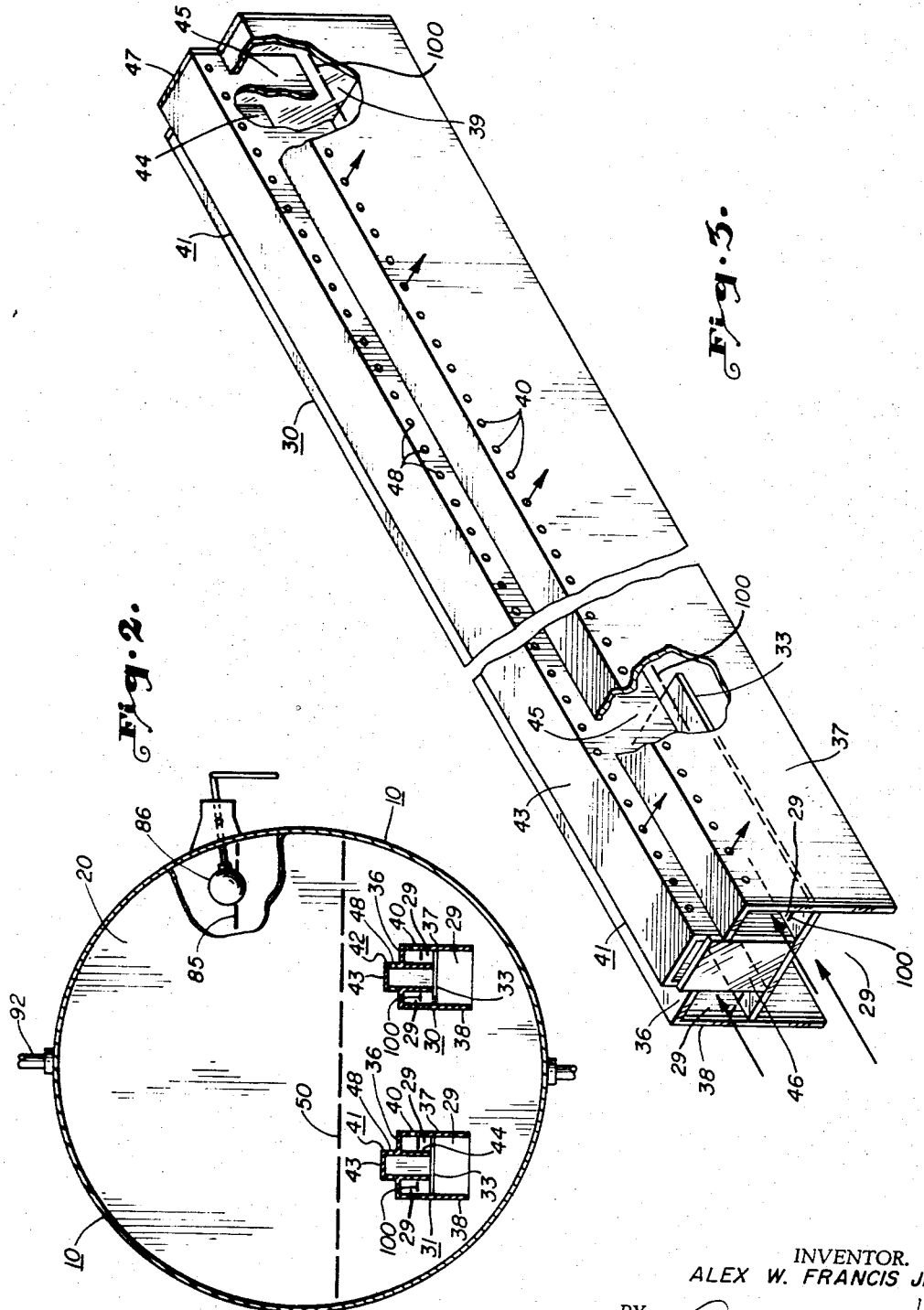
INVENTOR.
ALEX W. FRANCIS JR.
BY *Arthur L. Wade*
ATTORNEY United States Patent Office 3,418,252
Patented Dec. 24, 1968

3,418,252
EMULSION TREATMENT APPARATUS
Alex W. Francis, Jr., Tulsa, Okla., assignor to Combustion Engineering, Inc., New York, N.Y., a corporation of Delaware
Filed Nov. 25, 1966, Ser. No. 597,158
5 Claims. (Cl. 252—360)

ABSTRACT OF THE DISCLOSURE

A vessel, horizontally extended, is shown with oil well fluids produced into the left-hand compartment and subsequently distributed at the lower portion of the right-hand compartment for upward flow into an electrostatic field for removal of water. A distributing structure in the lower portion of the right-hand compartment is shown in detail.

BACKGROUND OF THE INVENTION

Field of the invention.—This invention relates to a new and improved apparatus for uniform feeding of an incoming liquid for upward flow through a body of liquid in emulsion treaters and other equipment.

Description of the prior art.—Historically, increased efficiency in distillate treaters, desalters, and other equipment has resulted from improved distribution into and/or collection from the treating zone. With improved flow of the liquid being treated through the treating zone, a maximum utilization of the cross-sectional area of the treating vessel is approached, with a resultant increase in treating efficiency.

In equipment of this type it is usually desirable to convert the high velocity incoming liquid stream into a slow moving stream which advances substantially non-turbulently along a large passage with substantially laminar flow and with all filaments of the liquid being treated moving with substantially equal velocities in a cross-sectional plane transverse to the flow direction. Various forms of distributors have been used for this general purpose in the past, usually comprising some form of drilled pipe arrangement or some form of inverted pan with weirs or notches along the edges thereof. Some prior art distributors are shown in U.S. Letters Patent Nos. 2,894,895, 3,141,000, and 3,207,686. These patents also show typical treaters with which the present invention may be utilized. The present invention is suitable for obtaining improved separation in gravity treating systems as well as in electrical and chemical-electrical systems of the type shown in these patents.

SUMMARY OF THE INVENTION

It is an object of the present invention to provide a new improved distributor structure for uniform feeding of an incoming liquid for upward flow through a body of liquid in a treater. To carry out this object, the invention contemplates a distributor in the form of an inverted or open bottom trough, with a row of openings in at least one side thereof, such that the pressure across the openings due to the vertical distance between the openings and the incoming liquid-treater liquid interface within the trough is substantially the same for all openings, therefore providing substantially uniform flow of incoming liquid through all the openings. Additionally, a superstructure, also in the form of an inverted or open bottom trough, is mounted through the top of the first trough so as to extend its legs down into the first trough. The superstructure trough also has a row of openings in at least one side thereof, above the top of the first trough to provide a self-adjusting operation for one range of flow rates utilizing the row of openings in the first trough and for another substantially greater range of flow rates utilizing both the first row of openings and the second row of openings.

The invention also comprises novel details of construction and novel combinations and arrangements of parts, which will more fully appear in the course of the following description. The drawings merely show, and the description merely describes, preferred embodiments of the present invention which are given by way of illustration or example.

BRIEF DECRIPTION OF THE DRAWING

FIG. 2 is a vertical sectional view taken along the line 2—2 of FIG. 1; and

FIG. 3 is an isometric view of one distributor trough for the treater.

DESCRIPTION OF THE PREFERRED EMBODIMENT

General treater structure

Figure 1:
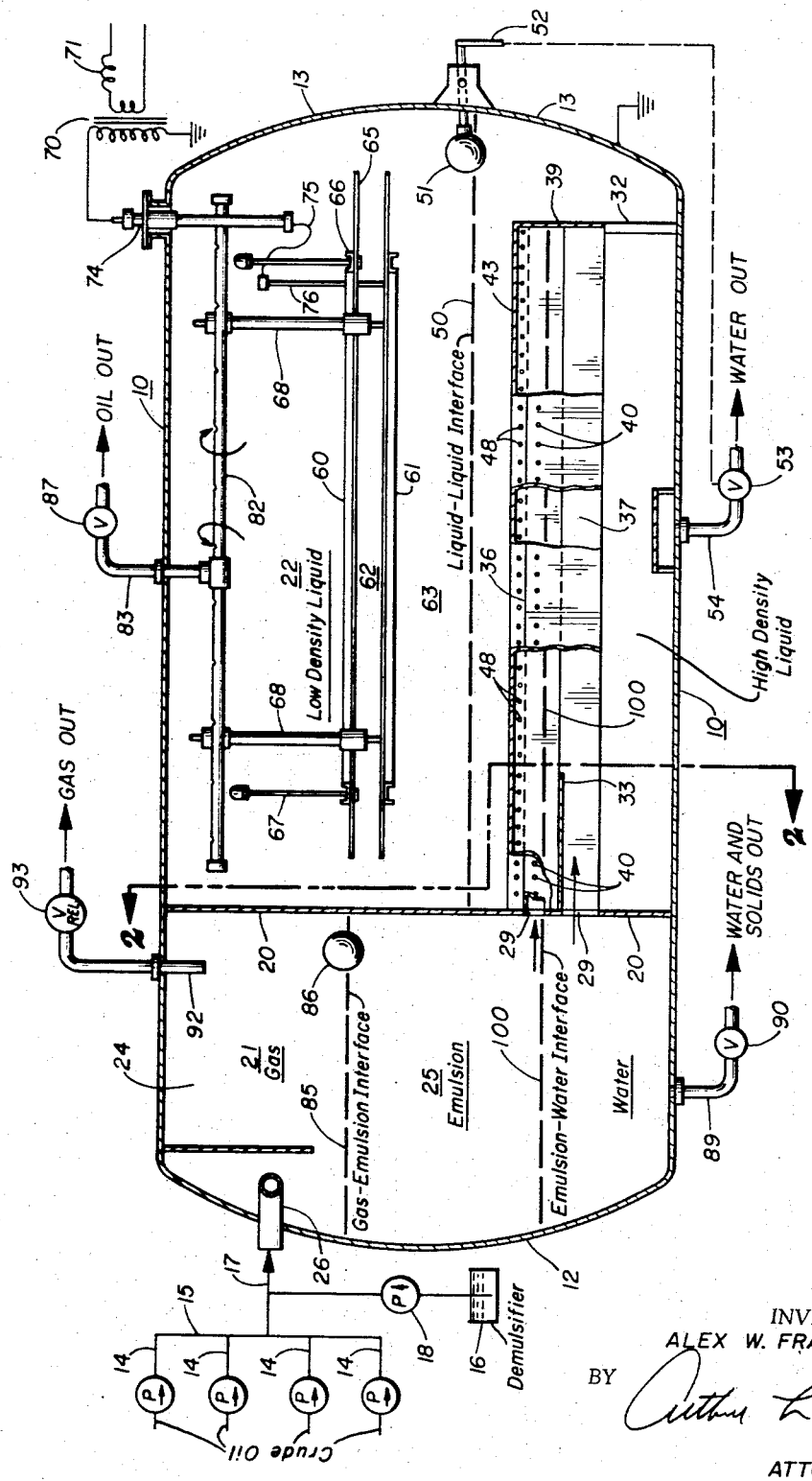
FIG. 1 is a vertical sectional view of a double compartment electric treater incorporating the invention.

The invention can be incorporated in any suitable upright or horizontal container and is illustrated in FIGS. 1 and 2 as including a horizontally disposed container 10 closed by heads 12 and 13. An incoming liquid, such as a crude oil emulsion from one or more wells or storage tanks, can be pumped through lines 14 to a manifold 15 and thence into the treater. Although not essential, it is often desirable to introduce a small amount of a chemical demulsifying agent into the emulsion ahead of the treater. This agent may be of any known type and will be selected with reference to its ability to aid the particular treatment to be carried out in the container. It can be pumped from storage 16 to the inlet line 17 by a metering pump 18.

The interior of the container 10 is divided by a partition 20 to provide a gas separating section 21 and a main treating section or chamber 22. An upper gas space 24 and a lower emulsion space 25 are provided within the section 21. The incoming liquid may be discharged at any position in the chamber 21 but preferably discharges into the gas space 24 through a laterally orificed distributor 26. A heat source may be mounted in chamber 21 to aid in demulsification.

Distributor troughs

Distributor troughs 30, 31 are mounted in the chamber 22 in parallel arrangement, the troughs being supported at the right ends on legs 32 and at the left ends by the partition 20. Openings 29 in the partition 20 provide for fluid flow from the chamber 21 into the troughs 30, 31, respectively. Plates 33 may be provided along the bottom of the troughs adjacent the inlet openings for structural support. The two troughs are identical in construction and only one will be described in detail.

The troughs 30 and 31 have tops 36, spaced sides 37, 38 and ends 39 which, together with plates 33 when used, form inverted trough structures with open bottoms. A horizontal row of openings 40 is provided along at least one side of the troughs. The openings are preferably equally spaced and ordinarily a row of openings will be provided on each side of each trough to aid the desired uniform distribution. Similar openings may also be provided in the end 39. The tops 36 may slope downwardly away from the openings 29 a slight amount permitting gas to flow from the trough back into the section 21.

On the top of each of the troughs 30 and 31 is mounted a secondary trough as a superstructure. Similar to troughs 30 and 31, superstructure troughs 41 and 42 have tops 43, spaced sides 44 and 45. Additionally, the ends of these superstructures are closed by end plates 46 and 47. The bottoms of these superstructure troughs are open, but the sides 44 and 45 extend down, through tops 36 a finite distance below the horizontal plane of openings 40 in the sides 37 and 38. A horizontal row of openings 48 is provided along at least one of sides 44 and 45 above tops 36.

The tops 43 are parallel with tops 36 and therefore also slope downwardly away from openings 29 to provide a flow path for gas back into section 21 through an opening provided in end plate 46. In an alternative arrangement, one or more vent openings may be provided in the tops 43 of the secondary troughs for the purpose of venting gases which may collect within these troughs.

The operation of the distributor troughs will be described in detail hereinbelow. One or more than two distributor troughs may be utilized. For best operation of a treater, the outlet openings should be arranged to provide outlet streams uniformly distributed across the working area of the treater and the particular arrangement illustrated is presently preferred for containers of this general shape.

General treater operation.—In a typical treater, the chamber 22 is filled with a body of liquid comprising a higher density liquid in the lower portion of the chamber and a lower density liquid in the upper portion of the chamber, with the two liquids merging at an interface plane indicated by the dashed line 50. The position of the interface plane 50 is maintained substantially constant by a level control means of known type, shown as including a float 51 operating a linkage 52 which controls the setting of a valve 53 in a line 54 which withdraws the higher density liquid from the bottom of the chamber 22.

The treater is illustrated herein as incorporating a conventional electrode system for establishing a high voltage electrostatic field in that portion of the chamber 22 above the plane 50 to treat the rising emulsion. Such an electric field will coalesce the dispersed water particles of an emulsion into masses of sufficient size to gravitate to the chamber 22. As shown, upper and lower foraminous electrodes 60 and 61 define two treating spaces comprising a main treating space 62 between the electrodes and an auxiliary treating space 63 between the lower electrode 61 and the body of water in the lower portion of the chamber. Each electrode may comprise a sheet of metallic screen 65 supported on a suitable framework 66. Hangers 67 suspend the upper electrode 60 from the container to maintain this electrode at ground potential. The lower electrode 61 is suspended from the container by insulators 68 and is energized by a high voltage transformer 70. The A.C. potential applied to the primary of this transformer is suitably controlled by a choke coil 71.

The high voltage terminal of the secondary winding is connected through an inlet bushing 74 to a conductor 75 which in turn is connected to a post 76 rising from the electrode 61 through an opening (not shown) of the upper electrode 60.

The treated liquid, typically the oil largely free of dispersed water, is withdrawn from the upper end of the chamber 22, preferably through a multi-orificed piped network 82 comprising two longitudinal pipes centrally connected to a riser pipe 83 extending to a position outside the container. Longitudinal pipes preferably have upwardly facing orifices distributed throughout the upper interior of the chamber 22 to aid in establishing the uniform flow rising mass of liquid in this chamber.

There is an interface in the chamber 21 between the gas in the upper portion thereof and the incoming liquid in the lower portion thereof, indicated by the dashed line 85. The level of this interface is maintained relatively constant by a level control means 86, typically another float and linkage, which controls a valve 87 in the treated liquid effluent line 83. An outlet line 89 with a control valve 90 may be utilized for periodic flushing out of solids which may collect at the lower portion of the chamber 21. The separated gas collecting in the upper portion of the chamber 21 may be removed through a line 92 having an adjustable pressure relief valve 93 therein, which valve is set to maintain any desired back pressure on the container.

Distributor trough operation.—In the operation of the treater the incoming liquid mixture flows within a predetermined initial range of rates in through the distributor 26 into the chamber 21. The lower density emulsion then flows through the upper inlet openings 29 into the troughs 30 and 31 and out of the troughs through the outlet openings 40. The higher density water flowing into the troughs through lower openings 29 escapes below the bottom of sides 37, 38 and is drawn off through valve 53. The incoming liquid then rises slowly through the body of liquid in the chamber 22, during which time the treatment occurs, the treatment ordinarily being separation of some constituent from the incoming emulsion typically the removal of water from the emulsion. The treated oil accumulates at the upper side of the chamber 22 and is withdrawn through the outlet line 83.

As indicated previously, it is highly desirable that during the treatment phase, the liquid being treated move vertically at a slow and uniform rate and that the liquid be uniformly distributed throughout the treatment chamber. This is accomplished with the structure of the invention by providing all outlet openings of the distributor trough substantially uniformly spaced throughout the chamber and by providing a trough construction which initially produces a substantially uniform pressure across the first set of outlet openings 40. With this arrangement, uniform amounts of the incoming liquid within the first range of flow rates are introduced into the treatment chamber over the entire horizontal area of the chamber.

There is an interface, indicated by the dashed line 100, within the distributor trough and the section 21 between the incoming liquid and the higher density liquid in the lower portion of the container. Typically this is the interface between the lighter incoming emulsion and the heavier water which collects in the lower portion of the treater. The buoyant force resulting from the higher density liquid, e.g., the separated water, submerging and acting upwardly on the incoming liquid, e.g., the incoming emulsion, at the interface forces the incoming liquid out the outlet openings 40. The pressure across an outlet opening due to this buoyant force is proportional to the vertical distance between the opening and the interface within the trough. With a horizontal row of openings 40, as illustrated in FIG. 1, and the small gradient of interface 100 due to flow from opening 29, the pressure is substantially the same across each opening so that there is a substantially uniform pressure acting to feed the incoming liquid out each opening, resulting in a substantially uniform rate of flow of liquid into the treating chamber from each of the openings. With this structure, the rate of flow of liquid from an outlet opening 40 of a trough will be dependent upon the vertical distance between the outlet opening and the interface 100 and will be substantially independent of other factors, such as position of the opening along the trough. It is preferable to have the cross-sectional area of the troughs relatively large so that the velocity of flow of the incoming liquid along the trough is very low. Then there will be negligible pressure drop along the trough, the interface 100 will be substantially horizontal and all the outlet openings will be operating at substantially the same pressure differential.

The distributor trough may be used with an incoming rate of flow which varies over a wide range, without requiring any change or control of the incoming rate of flow. Stated differently, the distributor trough is self adjusting for variations in flow rate as well as for variations in specific gravity and temperature. An increase in incoming flow rate will increase the quantity of incoming liquid distributed by the trough and move the interface 100 downward. Downward movement of the interface increases the buoyant force acting on the lower density fluid volume above interface 100, and thereby increases the rate of flow through the outlet openings. This permits the distributor to handle the increased rate of flow without requiring any regulation on the incoming flow. Similarly, a decrease in the incoming flow rate results in a rising of the interface, a reduction of the lower density fluid volume, and a corresponding decrease in flow through the outlet openings. Of course, there is an upper limit to the range of flow rates, a limit at which it is necessary to bring additional holes into operation in order to maintain the desired distribution. Superstructure troughs 41 and 42 provide this distribution at a second range of flow rates which exceed the predetermined capacity of the holes 40.

FIG. 2 discloses clearly that, within the initial range of flow rates, interface 100 will have its horizontal plane between the height of holes 40 and the lower ends of sides 44 and 45 which extend down through tops 36 and into troughs 30 and 31 to a horizontal plane a finite distance below holes 40. Therefore, when the increasing flow rate from section 21 causes the interface 100 to move downward, increasing the flow through holes 40, eventually, at a predetermined maximum rate, the interface falls below the lower ends of sides 44 and 45.

When interface 100 sinks below sides 44 and 45, emulsion to be distributed flows into troughs 41 and 42 and up to holes 48. The pressure of the higher density liquid, e.g., the separated water, acts upwardly on the emulsion and forces this liquid out of holes 48 at the same time it also forces this liquid out holes 40. The pressure across the holes 48 is proportional to the vertical distance between these holes and the interface 100. Therefore, a second, and greater, range of flow rates through openings 29 is matched with distribution flow through both holes 40 and holes 48.

It has been suggested that to increase the capacity of troughs similar to 30 and 31, a second row of holes be formed in sides 37 and 38 below holes 40. It has been recognized that the pressure across the openings of the lower row will be less than the pressure across the openings of the upper row. It has been suggested that the lower holes be either larger in diameter or more numerous.

The superstructure trough of the present invention avoids the necessity for different hole areas, or different numbers of holes. By placing the second set of holes in the superstructure trough, above the first set, a higher pressure is available to force the fluid to be distributed through the high-capacity holes. Therefore, this invention avoids the larger hole size for a second set of holes in troughs 30 and 31 which would tend to approach the characteristics of notches or weirs along the bottom edges of sides 37 and 38.

It should now be clear that operation of the distributor of the invention is in sharp contrast with that of the inverted trough distributor utilizing double rows of holes or notches or weirs along the bottom edges. With the notched construction, which would be approached by the double row of holes, no appreciable pressure can be developed across the notch and therefore there would be no uniform pressure forcing liquid through all of the outlet notches with the interface having a finite gradient along the length of the trough. The key to the advantage of the present invention is the creation of a greater pressure across the second set of holes 48. A positive, two-stage distribution force is thereby created on the lighter liquid, emulsion in this embodiment.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an emulsion separating treater with a distributor for uniform feeding of an incoming emulsified liquid for upward flow through a body of liquid in the treater, the combination of:
   a container for a body of a first lower density liquid and a second higher density liquid, respectively, above and below an interfacial zone within said container;
   an inverted horizontally disposed trough mounted in the container submerged in the body of liquid, a first portion of the trough having an open bottom, a top, one closed end and spaced elongated sides, and a superstructure having an open bottom, a top, spaced elongated sides and a closed remote end extending down through the top of the first portion;
   an inlet for feeding the incoming liquid into the other end of the first portion of the trough above the open bottom to provide an internal interface between the incoming liquid and the second higher density liquid therein;
   outlet means for the first portion of the trough comprising a horizontal row of openings spaced along at least one of the sides of the first portion with all portions of the openings being above the open bottom thereof, the pressure across the openings varying directly as a function of the distance of the internal interface below the openings, the internal interface rising and falling within the first portion below the level of the openings in the first portion in response to decrease and increase in flow rate of the incoming liquids;
   outlet means for the superstructure comprising a horizontal row of openings spaced along at least one of the sides or top of the superstructure and above the top of the first portion of the trough, the first lower density liquid above the interface and lying within the first portion below the lower edges of the sides which extend down through the top of the first portion flowing from the openings of the superstructure due to a buoyant force varying as a function of the distance of the internal interface below the openings;
   and means for maintaining the interface above the open bottom of the first portion and spaced vertically below the first portion outlet means.

2. An apparatus as defined in claim 1, in which all openings of the outlet means are in the form of individual holes horizontally spaced along the trough.

3. An apparatus as defined in claim 1 comprising two of the troughs disposed in the container in parallel relation, each of the troughs having at least one of said rows of openings in each side member thereof all in the same horizontal plane, and including means for directing the incoming liquid to the inlets of the first portion of the trough.

4. In a distributor for a treater for uniform feeding of an incoming liquid for upward flow through a body of liquid in the treater, the combination of:
   an inverted horizontally disposed trough submerged in the body of liquid, the trough having a top and spaced sides forming an open bottom in open communication with a portion of the body of liquid;
   an inlet for feeding said incoming liquid into a first portion of the trough over a first range of flow rates, the incoming liquid forming an interface within the first portion between the incoming liquid and the body of liquid;
   outlet means comprising a horizontal row of openings spaced along at least one side of the first portion of the trough with all portions of each opening being above the open bottom of the trough, the total area of the openings being of a magnitude to permit flow therethrough of the incoming liquid within the first range of flow rates while maintaining the interface at a level between that of the openings and that of the open bottom;

an inverted horizontally disposed second portion of the trough mounted to extend down through the top of the first portion, the lower edges of the superstructure sides extending to a horizontal plane below the openings of the first portion;

and outlet means comprising a horizontal row of openings spaced along at least one side of the second portion and above the top of the second portion, the total area of the openings being of a magnitude to permit flow therethrough of the incoming liquid flowing beneath the lower edges of the second portion sides to maintain the interface at a level between that of the lower edges of the second portion sides and that of the open bottom of the first portion.

5. A distributor for liquid including:
a source of liquids having different densities,
means providing residence time during which the liquids form an interface between themselves,
a first inverted and open-bottomed trough connected to the source and arranged horizontally to maintain the interface within the length of the trough,
a row of holes in the first trough above the interface through which the lighter of the liquids flows in distribution over a first range of flow rates into the trough,
a second inverted and open-bottomed trough extending down into the first trough to below the holes of the first trough and the interface during the first range of flow rates,
and a row of holes in the second trough above the top of the first trough through which a portion of the lighter liquid flows in distribution over a second range of flow rates into the trough which force the interface below the lower edges of the sides of the second trough.

References Cited

UNITED STATES PATENTS

| 2,181,686 | 11/1939 | Walker | 252—362 |
| 2,398,338 | 4/1946 | Walker | 252—360 X |
| 2,420,115 | 5/1947 | Walker et al. | 252—361 X |
| 2,601,904 | 7/1952 | Erwin | 252—363 X |

NORMAN YUDKOFF, *Primary Examiner.*

J. SOFER, *Assistant Examiner.*

U.S. Cl. X.R.

204—302; 55—174